C. S. HENSLEE.
SUBMARINE DESTROYING APPARATUS.
APPLICATION FILED MAR. 5, 1918. RENEWED APR. 5, 1919.
1,315,122.  
Patented Sept. 2, 1919.  
2 SHEETS—SHEET 1.
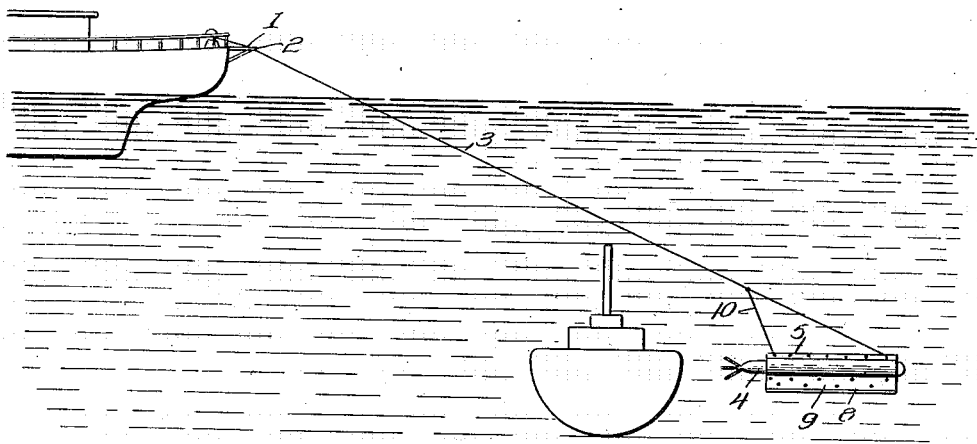
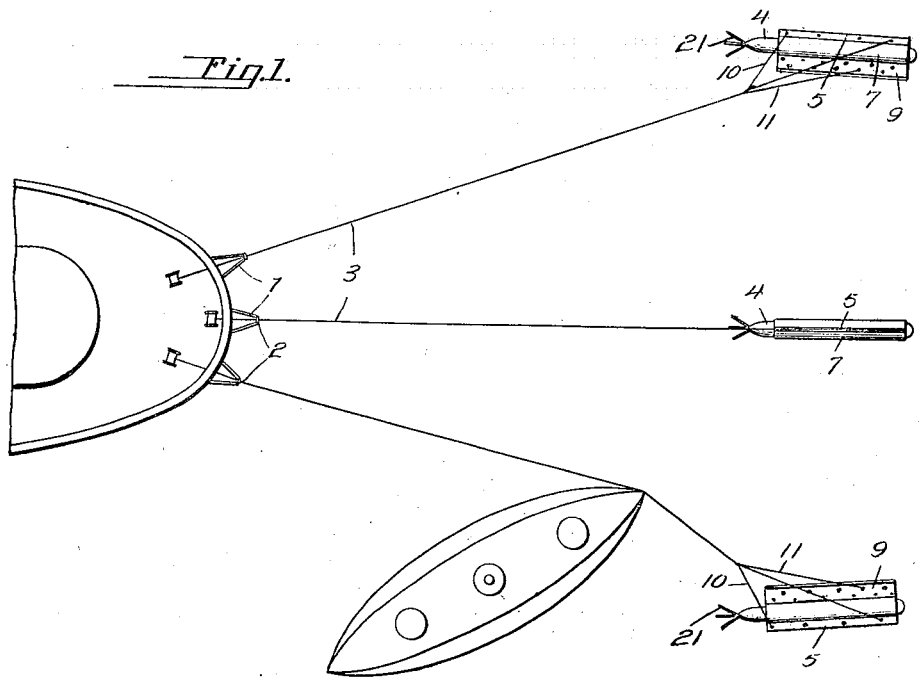
Witnesses  
F. C. Gibson.
Inventor  
C Stewart Henslee.
By Victor J. Evans  
Attorney

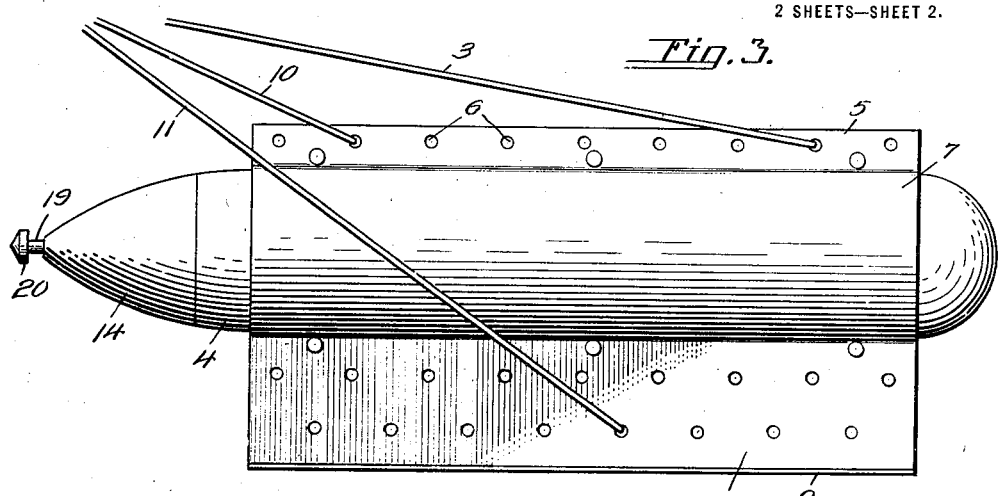
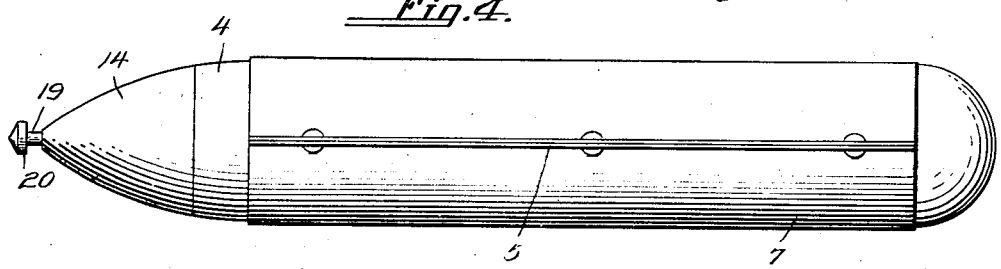
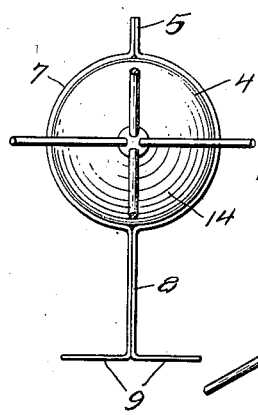
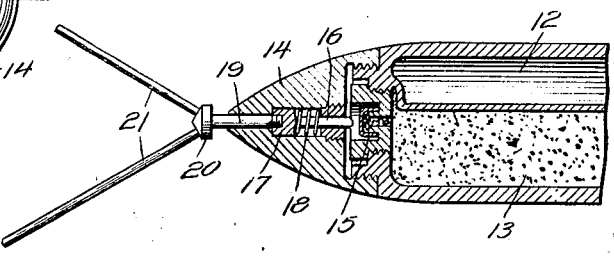

UNITED STATES PATENT OFFICE.

CONRAD STEWART HENSLEE, OF NORTH CHATTANOOGA, TENNESSEE.

SUBMARINE-DESTROYING APPARATUS.

1,315,122. Specification of Letters Patent. Patented Sept. 2, 1919.

Application filed March 5, 1918, Serial No. 220,525. Renewed April 5, 1919. Serial No. 287,922.

*To all whom it may concern:*

Be it known that I, CONRAD STEWART HENSLEE, a citizen of the United States, residing at North Chattanooga, in the county of Hamilton and State of Tennessee, have invented new and useful Improvements in Submarine-Destroying Apparatus, of which the following is a specification.

This invention relates to apparatus adapted to be used for destroying mines, submarines and similar vessels or objects and it consists in the novel features hereinafter described and claimed.

An object of the invention is to provide an apparatus adapted to be carried by a floating vessel and which may be attached to the stern thereof and paid out so that it will follow in the wake of the vessel. In other words the active parts of the destroying apparatus are towed by the vessel and they are so arranged and constructed that they will normally float at the surface of the water. However when the vessel is moving through the water they are so rigged as to float or to sink or descend below the surface of the water to a desired depth whereby they may come in contact with a submerged vessel as the floating vessel passes over and beyond the same.

The active elements of the apparatus are so arranged and rigged that they may be connected with the floating vessel in the form of a cluster and the members will separate or spread with relation to each other as they move through the water and consequently they will cover considerable area or space.

Another object of the invention is to provide an active element of an apparatus as stated of simple structure which includes means for buoying the same whereby the element will normally float at the surface of the water, means for exploding the same and a firing device or devices for igniting the explosive charge.

In the accompanying drawings:

Figure 1 is a fragmentary top plan view of a vessel with the destroying apparatus attached thereto.

Fig. 2 is a similar side view of the same.

Fig. 3 is an enlarged side elevation of a body used in the apparatus.

Fig. 4 is a top plan view of the same.

Fig. 5 is an end view of the same.

Fig. 6 is a fragmentary sectional view of the same.

The apparatus includes a guide or guard 1 adapted to be attached to a vessel in the vicinity of a hawser pipe thereof. The said guide is preferably pivotally connected with the hull of the vessel and is provided at its outer end with an eye 2. A towing cable 3 passes through the eye 2 and may pass through the hawser pipe of the vessel and around a windlass in a usual manner. Any number of cables and guides may be used as will be found necessary or desired.

Each active element of the apparatus includes a cylindrical body 4 which is provided at its top side with an upstanding fin 5 which is provided with a number of openings 6 to any of which the rear end of the cable 3 may be connected. A bracket 7 is attached to the body 4 and is provided with flanges 8 located at the opposite sides of the body 4 from the fin 5 and substantially in alinement with the same. The flanges 8 are provided at their lower portions with outstanding ledges 9 which may serve as stabilizers for the body 4 as hereinafter described. A guy cable 10 is attached at one end with the cable 3 at a point between the ends thereof and at its other end may be adjustably connected to the forward portion of the fin 5 whereby the body 4 may be held at a desired angle with relation to the cable 3. A cable 11 is connected at one end with the cable 3 at a point between the ends thereof and the other end of the said cable 11 may be connected with the flanges 8 at any point along the length thereof whereby the flanges 8 may be held at an inclined position with relation to a vertical line. The body 4 is provided at its upper portion and extending longitudinally thereof with an air chamber 12 and at its lower portion with a chamber 13 adapted to receive an explosive material.

A pointed cap 14 closes the forward end of the body 4 and carries a cartridge 15 which when fired is adapted to ignite the explosive carried in the chamber 13. A firing pin 16 is slidably mounted in the cap 14 and its rear end is normally held spaced from the forward end of the cartridge 15. The pin 16 carries at its forward end a socket member 17. A spring 18 is interposed between the socket member and the rear portion of the cap 14 and is under tension with a tendency to hold the pin 16 away from the cartridge 15. A bolt 19 is screw-threaded into the socket member 17 and a head 20 is detachably mounted upon the forward end of the bolt. A suitable number of antennæ 21 are mounted upon the head 20 and extend in a forward direction in front of the cap 14.

When the apparatus is in use the body 4 is towed by the cable 3 in the wake of the vessel to which the apparatus is attached. In the event that the cables 10 and 11 are not used the body 4 will follow immediately behind the hull of the vessel. When the vessel is not moving in the water the body 4 will come to the surface in view of the fact that its upper portion is filled with air. When the vessel moves in a forward direction the forward end of the body 4 will tilt in a downward direction owing to the fact that the rear end of the cable 3 is connected with the fin 5 at a point between the ends thereof. Therefore the body 4 will be drawn below the surface of the water. The extent to which the body will be drawn below the surface of the water depends upon the rate of speed at which the vessel travels and also upon the point at which the rear end of the cable 3 is connected with the fin 5.

When the cables 10 and 11 are connected with the cable 3 and the fin 5 and flanges 8 the body 4 may be held at a desired angle with relation to the tow line or cable 3 whereby the body will have a tendency to move in an outward direction from the line of travel of the vessel as the vessel moves in a forward direction. This is due to the fact that the water will offer resistance against the sides of the fin 5 and the flanges 8 which are held at angles to the line of movement of the vessel. Therefore several of the bodies 4 may be connected with the hull of the vessel and one body will follow immediately behind the same and the other body or bodies follow at points at the opposite sides of the line of movement of the vessel. Also all of the bodies will be submerged below the surface of the water when the vessel is moving through the same, and the depth at which the bodies sink into the water may be regulated as hereinbefore indicated.

Should a vessel be submerged below the surface of the water and any one of the cables 3 pass over the same said cable will foul on such vessel and draw the attached body 4 toward the said submerged vessel and when one of the antennæ 21 strikes the vessel the bolt 19 will be moved in an inward direction whereby the socket member 17 and pin 16 are moved in an inward direction against the tension of the spring 18 and the pin strikes the cartridge 15 and fires the same. The said cartridge in turn sets off the explosive material contained within the chamber 13 and consequently an explosion takes place, at the exterior of the submerged vessel and which will result in the destruction of the same.

It is apparent that by following the practices of marine navigation or manipulation the active elements of the apparatus which travel beyond the sides of the line of path of movement to which they are attached may be brought under and against vessels floating at the surface of the water and exploded against them. It is also apparent that in view of the fact that the cluster made up of the several active elements and their connecting cables will cover considerable area and should any one of the cables come in contact with the mooring chain of a submerged mine the active element will be exploded against the mine which will destroy the same or the apparatus will drag which will indicate the presence and position of a mine below the surface of the water and consequently the said mine may be removed or destroyed by using other means.

Perforations may be provided in the flange fin or ledges at desired points whereby the cables or lines may be attached to them at any desired points.

Having described the invention what is claimed is—

An apparatus of the character described a body adapted to float in water, and a bracket member receiving the body and provided with outstanding flanges located at the opposite sides of the body, one of the flanges being provided at its opposite sides with angularly disposed ledges.

In testimony whereof I affix my signature.

CONRAD STEWART HENSLEE.